United States Patent
Heilbronner et al.

[11] Patent Number: 6,067,720
[45] Date of Patent: May 30, 2000

[54] METHOD FOR DETERMINING A TORSIONAL STRUCTURE IN THE SURFACE ROUGHNESS OF A FINISHED SHAFT JOURNAL

[75] Inventors: Robert Heilbronner, Backnang; Norbert Rau, Kirchheim; Michael Seibold, Schwaebisch Gmuend, all of Germany

[73] Assignee: DaimlerChrysler AG, Germany

[21] Appl. No.: 09/152,337

[22] Filed: Sep. 14, 1998

[30] Foreign Application Priority Data

Sep. 12, 1997 [DE] Germany ................... 197 40 141

[51] Int. Cl.$^7$ ................................................ G01B 5/20
[52] U.S. Cl. .................. 33/553; 33/551; 33/554; 33/555
[58] Field of Search .................... 33/553, 545, 546, 33/548, 549, 551, 554, 555

[56] References Cited

U.S. PATENT DOCUMENTS

| | | | |
|---|---|---|---|
| 2,825,140 | 3/1958 | Musser et al. | 33/555 |
| 3,400,463 | 9/1968 | Barringer | 33/546 |
| 4,377,911 | 3/1983 | Iida et al. | 33/551 |
| 4,706,360 | 11/1987 | Callens, Jr. et al. | 33/554 |
| 5,146,690 | 9/1992 | Breitmeier | 33/551 |
| 5,321,894 | 6/1994 | Bury | 33/553 |
| 5,528,033 | 6/1996 | Lo et al. | 250/307 |

FOREIGN PATENT DOCUMENTS

| | | |
|---|---|---|
| 31 01 410 A1 | 12/1981 | Germany . |
| 31 21 161 A1 | 2/1982 | Germany . |
| WO 95/25940 | 9/1995 | WIPO . |

OTHER PUBLICATIONS

Rau et al., "Drallstrukturen geschliffener Dichtflächen beurteilen", *Werkstatt und Betrieb*, Nov. 1997.

*Primary Examiner*—Christopher W. Fulton
*Attorney, Agent, or Firm*—Evenson, McKeown, Edwards & Lenahan, P.L.L.C.

[57] ABSTRACT

A method for determining a torsional structure in the surface roughness of a finished shaft journal includes making a plurality of axial scores on a circumferential strip of the shaft journal, with a high axial measurement point density at different but exactly known circumferential positions as well as with exactly known axial positions. The individual local roughness profiles are printed out in a close sequence with respect to one another corresponding to their positions. The measurement charts are raised or elongated in the radial and axial directions and upset in the circumferential direction. Thus, a topography with multidimensional affinity showing the microstructure of the surface in three dimensions in a diagonal view is obtained. An autocorrelation function is formed from this topography, stochastic elements are eliminated, and a surface topography is obtained that essentially contains only the periodic elements. From this surface topography, the characteristics of the torsional structure such as the angle of twist, period length, pitch, torsional slope, and the like can be determined.

18 Claims, 5 Drawing Sheets

0.98 mm; 200 P/mm 1.00 mm; 200 P/mm 1.00 mm; 200 P/mm 1.00 mm; 128 P/mm

METHOD FOR DETERMINING A TORSIONAL STRUCTURE IN THE SURFACE ROUGHNESS OF A FINISHED SHAFT JOURNAL

BACKGROUND AND SUMMARY OF THE INVENTION

This application claims priority of German Patent Application No. 197 40 141.4, filed Sep. 12, 1997, the disclosure of which is expressly incorporated by reference herein.

The present invention relates to a method for determining a torsional structure in the surface roughness of a finished shaft journal. A method of this generic type is described, for example, in Rau et al., "Drallstrukturen geschliffener Dichtflächen beurteilen", *Werkstatt und Betrieb,* (November 1997).

As shown in FIG. 10, in order to provide a reliable sealing function at the points where shafts pass through housing walls (1), it is necessary to take into account the properties of both the sealing ring (2) provided with an annular radial sealing lip (3), and those of the opposed running surface (4) on the shaft journal side. As a rule, circumferentially ground journal surfaces are involved. (Other methods of finishing include burnishing, roller-burnishing, external abrasion, and finishing on a lathe.) In addition to specific roughness values, the designer also prescribes that the grinding structure be free of torsion for the shaft journals. In this case, the term "torsion-free" means that the surface structure that results from grinding is aligned precisely in the circumferential direction and there are no superimposed regular wave components.

It has also been assumed heretofore that plunge-cut grinding produces torsion-free structures. However, even the unreliable "thread" method (described below) shows that, at least with a certain combination of operating parameters, the plunge-cut grinding method can cause torsional structures to develop on workpiece surfaces finished in this fashion.

The radial sealing lip of a sealing ring abuts the surface of the shaft journal with a specific radial force imposed by a rubber-elastic sealing edge up to a certain axial width. As a result of the rotation of the shaft journal, the contact area of the sealing lip is deformed to varying degrees in the circumferential direction as a function of the local radial application pressure. Lesser deformations take place near the edge and the greater circumferential deformations occur more in the middle area of the application strip. This results in a sensitive tribological and rheological equilibrium with an oil flow that guarantees the lubrication of the contact zone as well as the sealing function of the annular seal maintained by a recycling mechanism as oil is drawn in and pumped back, thus producing an oil circuit. This equilibrium must not be disturbed by an imposition of torsion in the microstructure of the opposite running surface. A delivery effect for the oil caused by torsion in one direction or the other must be avoided. With a torsion-produced delivery effect in the sealed interior of the housing, the seal would run dry. Contamination from outside would be conveyed into the contact zone and the seal would wear prematurely and leak. An outwardly directed delivery effect would prevent the seal from running dry, but would cause oil to escape at the sealing point, which must be prevented more or less strictly for a variety of reasons.

In the past, these properties were monitored, if at all, by the so-called thread method, which yielded only highly unreliable results, which were frequently not even noticed. In the thread method, an oil-saturated thread of a specific structure, material, and thickness is wrapped around the top of the horizontally aligned shaft journal, over slightly more than 180°; the ends that hang down are fastened jointly to a small weight and the thread is subjected to a specific load in this fashion. The shaft is then turned twenty times slowly in one rotational direction and then twenty times in the other direction. The distance traveled axially by the thread on the surface of the journal is used as a measure of the torsional structure.

The thread method does deliver a clear measurement result. Comparative measurements by the applicant using the thread method and the present invention have shown, however, that the measurement results obtained by the thread method are in no way representative of the actual torsional structure of the journal surface. The measurement results obtained by the thread method also show no correlation whatever with the observable tightness results or the lifetimes of installed radial shaft sealing rings.

The goal of the present invention is to develop a method for determining a torsional structure in the surface roughness of a finished shaft journal that permits qualitatively and quantitatively assured statements regarding the formation and severity of the development of a torsional structure in the surface of a shaft journal.

This goal is achieved according to the present invention by detecting the microstructure of the journal surface at a plurality of measuring points, with a much higher point density being selected in the axial direction than in the circumferential direction. With a suitable choice of the display scales for the individual directions in space (e.g., elevation or elongation in the radial or axial directions and upsetting in the circumferential direction), the topography of a torsional structure becomes clearly visible in a three-dimensional representation of the measurement points.

The advantages of the present invention consist in the fact that for the first time a torsional structure on finished journal surfaces can be rendered clearly and reliably visible. With a greater manifestation of torsion, the most important characteristics such as angle of twist, direction of spiral, pitch, and the like, can be determined from such a primary representation of the topography. If additional parameters must be obtained, for example the delivery cross section, or if the torsion involved is less severely pronounced, a surface autocorrelation function can be formed from the representation of the measured points. The secondary topography thus obtained constitutes an image that is similar to the primary topography in which however stochastic (i.e., random) roughness components are eliminated and essentially only the periodic components are retained, thereby showing the periodicity of the twist (i.e., waviness).

Because every type of factor that causes torsion produces a different appearance of the microstructure of the surface, even the causes of the development of the torsion can be determined by the trained "reader" from the representation of the microstructure of the surface. By virtue of the experience gained with the present invention, it is possible to distinguish for example dressing torsion and offset torsion as the two most important forms of torsion that can develop when cylindrical surfaces are ground.

Other objects, advantages and novel features of the present invention will become apparent from the following detailed description of the present invention when considered in conjunction with the accompanying drawings.

DETAILED DESCRIPTION OF THE DRAWINGS

The development of torsion during grinding takes place first as a result of the dressing process of the grinding wheel or as a result of deviations from parallelism between the grinding wheel and the workpiece axis. Accordingly, a distinction can be made between different kinds of torsion.

Figure 1:
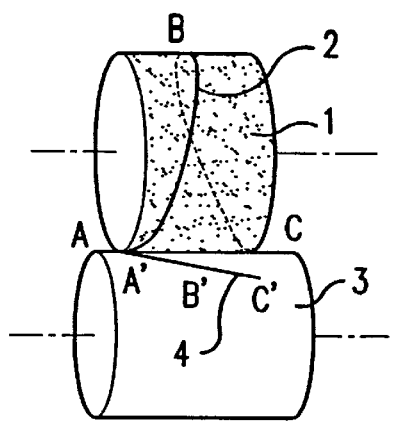
FIG. 1 is a schematic representation showing the cooperation between a grinding wheel and a workpiece, and the transfer of a dressing torsion from the grinding wheel to the workpiece.

In dressing torsion (FIG. 1, topography in FIG. 6), initially a single-flight dressing helix 2 is created on grinding wheel 1 by dressing with a so-called fleece or with a diamond tip. The helix leaves behind a flatter line 4 during the grinding process on workpiece 3 that corresponds to the lower circumferential speed thereof and this line is generally transferred to the workpiece as a multi-thread torsional structure.

Figure 2:
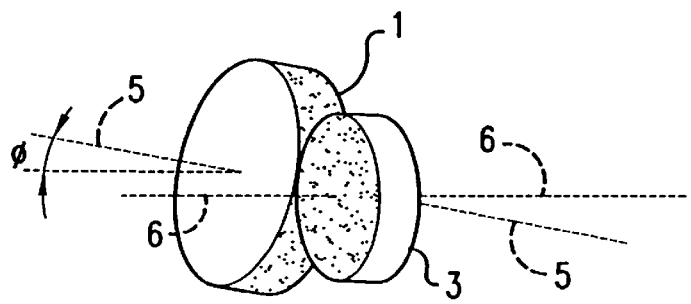
FIG. 2 is a schematic representation of the mutual arrangement of a grinding wheel and a workpiece in a state in which the rotational axes are defectively limited.

In offset torsion (FIG. 2), the cause of torsion lies in an offset angle Φ according to DIN 8630 as a deviation from parallelism between rotational axis 5 of grinding wheel 1 and rotational axis 6 of workpiece 3.

With zero torsion (FIG. 7), one sees an imposition of torsion as in dressing torsion, with the special feature that the angle of twist is exactly equal to zero.

Dressing torsion and zero torsion are classified as waviness because of the form they take, and are superimposed on the grinding structure. They are manifested uniformly over the entire sealing surface and have the property of permeability. This means that the pitch of a torsion runs continuously around the circumference. The permeability exists as long as the waviness component of the torsion is still manifested to at least the same degree as the roughness component of the grinding structure.

Manifestation of torsion adversely affects the sealing function of the surface to a degree that increases directly with the angle of twist and directly with the area cross section of one or more threads. Previously, a large number of sealing surfaces with torsional structures were measured and a great diversity in the manifestation of torsion was discovered. For an unambiguous description of these highly different torsional structures, the parameters mentioned below were introduced.

For unambiguous determination of torsional structures on finished shaft journals using the method according to the present invention, a measuring device 10 is required (FIG. 3) which in the example shown has a measuring spindle (spindle head 11) with a chuck 12 for position-defined holding of the part (i.e., workpiece). The workpiece must then be able to be positioned so that, if a test score 20 is repeated, it can be reproduced exactly at least in the minute range. Ideally, a positioning accuracy of ±5 angle-seconds would be optimum. The part that carries shaft journal 13 must be able to be held rotatably, and rotatably drivably, concentrically with respect to rotational axis 14 of the shaft journal during measurement in a workpiece holder 12, so that the part can be rotated in the defined angle increments 15 and locked in any desired angular position with an exact constant position of rotational axis 14. The circumferential position of shaft journal 13 must be able to be displayed as a signal that can be data-processed and reproduced in a signal evaluation.

Measuring device 10 is also provided with a scanning unit 16 for scanning the shaft journal along a defined straight line. The scanning unit 16, which can be adjusted transversely to the surface of the part (i.e., radially with respect to rotational axis 14), carries a pointed stylus 17 that can be placed on the surface and moved over the surface by means of a linear feed at a low traveling speed and a high recording density parallel to rotational axis 14. To eliminate considerable waviness or deviations of the shape of the journal from an exact cylindrical shape, the stylus is advantageously supported by skids on the surface of the journal, so that only the roughness in the surface is picked up by the stylus. The lifting of the stylus caused by the scanning process can be detected by means of a high-resolution displacement sensor (resolution less than 1 μm) and fed as data-processable signals into a signal evaluation device. The starting point of the traveling movement (i.e., the beginning of the recording relative to the axial position of the shaft journal) can be detected exactly for each individual score and likewise fed as a data-processable signal into the signal evaluation device.

Figure 3:
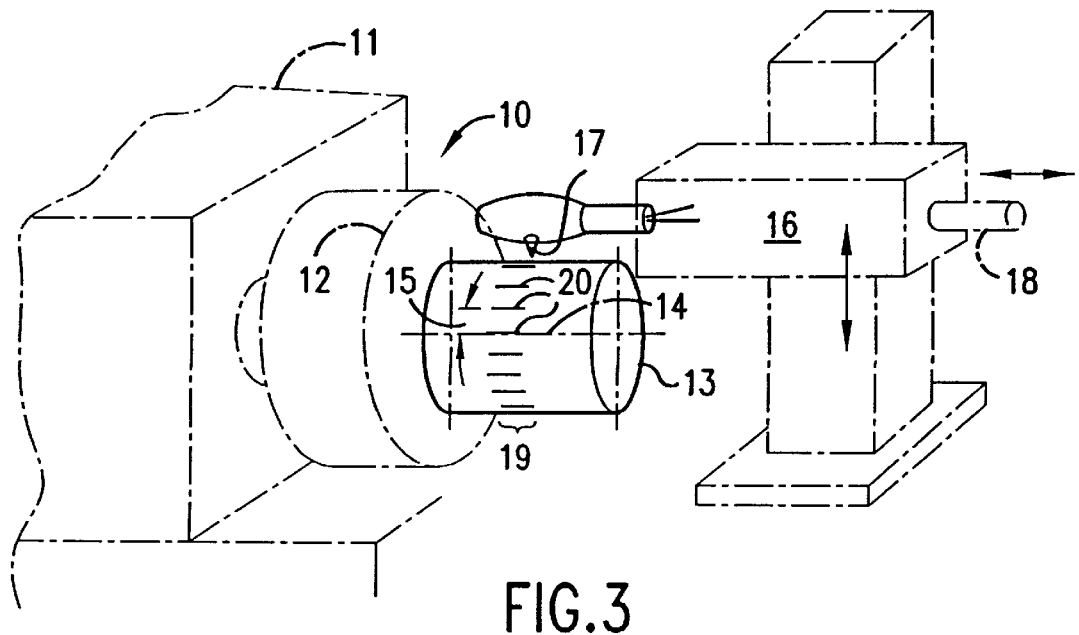
FIG. 3 shows an embodiment of a stylus instrument for carrying out the torsion determination method.
Figure 4A:
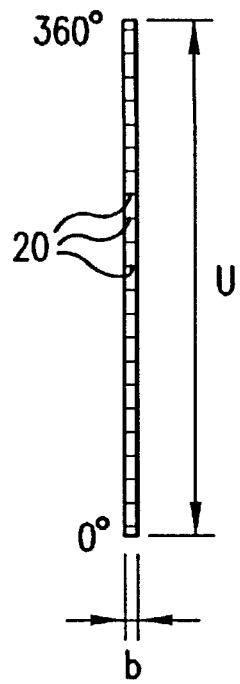
FIGS. 4a and 4b show the aspect ratios, in an unrolled view and opposite one another, of a circumferential strip with a plurality of scores running axially on a shaft journal (FIG. 4a), and the axial elongation and peripheral upsetting of this strip to form a "picture" with the usual aspect ratio (FIG. 4b)
Figure 4B:
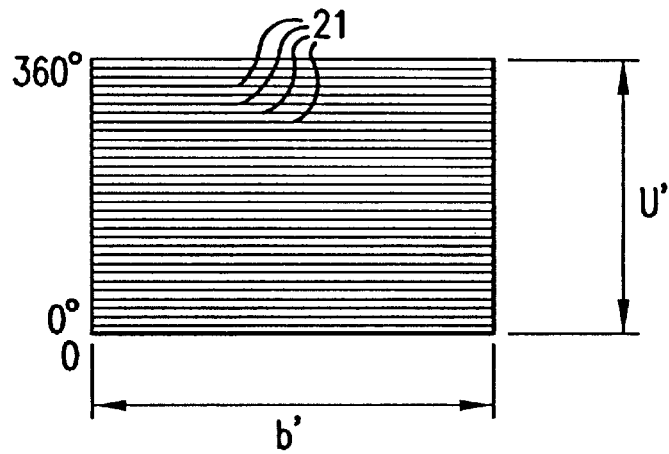

Measuring device 10 shown in FIG. 3 is based on a conventional stylus instrument which cooperates with a measuring spindle head 11. For the sake of completeness it should be mentioned that suitable devices can also be built on the basis of a shape tester for checking the shape of cylindrical surfaces. The latter have a horizontal measuring table with a compound slide rest to receive the workpiece; the cylindrical surface to be tested is mounted with its cylinder axis vertical. A vertical sleeve that holds the stylus is mounted above the measuring table, with the axis of the sleeve being located centrally with respect to the measuring table. The workpiece is rotatable relative to the stylus around a vertical axis and can be positioned with high accuracy. The rotary movement required for this purpose is accomplished by a rotary disk on the measuring table or by a rotatability of the sleeve or a rotatably mounted spindle in the sleeve.

To determine a torsional structure on a shaft spindle, the following procedure is performed: on a circumferential strip 19 of shaft journal 13 that is of interest, a plurality of axially aligned test scores 20 is made with a high axial measurement point density at circumferential positions that are different but each of which is exactly known, as well as with similarly exactly known axial positions.

The torsional structure on shaft journal 13 is determined in the area of such a circumferential strip 19, at which a closed sealing lip of an annular seal abuts the shaft journal. For torsion determination in new parts, the area of direct application of the sealing lip can be scanned. In the case of old parts in which the application area of the sealing lip is adversely affected by shaft wear, an immediately adjacent circumferential strip would be scanned in the justified expectation that this strip has the same microstructure as the area of direct application originally had. During measurement, data acquisition should take place on a circumferential strip of the shaft journal that is at least four times as wide and preferably approximately ten times as wide as the area of application of the sealing lip to the shaft journal. The graphic representation of the measured values in the manner indicated can remain limited to a narrower strip.

In order to obtain a clear representation of a torsional structure, the density of the measurement points in the scanning section should be 100 to 1000 measurement points per millimeter (and preferably 200 to 400 measurement points per millimeter) in the axial direction. In the circumferential direction, a much greater spacing of the measurement points can be provided, so that in the circumferential direction, the measurement point density can correspond to approximately 0.5 to 2 times the period length of the periodic components of the torsional structure. For this purpose as a rule the entire circumference of the shaft journal should be scanned. Accordingly, approximately 30 to 120 (and preferably 60 to 75) test scores are made on the circumference, uniformly distributed. In torsional structures with a higher pitch count, however, with a pitch higher than 15 for example, the choice must sometimes be made with a much higher resolution in the circumferential direction. For this purpose, it is not necessary in such cases to scan the entire circumference, but it is possible to make 30 to 120 (preferably 60 to 75) test scores uniformly distributed over a preferably decimal fraction of the entire circumference.

Figure 6:
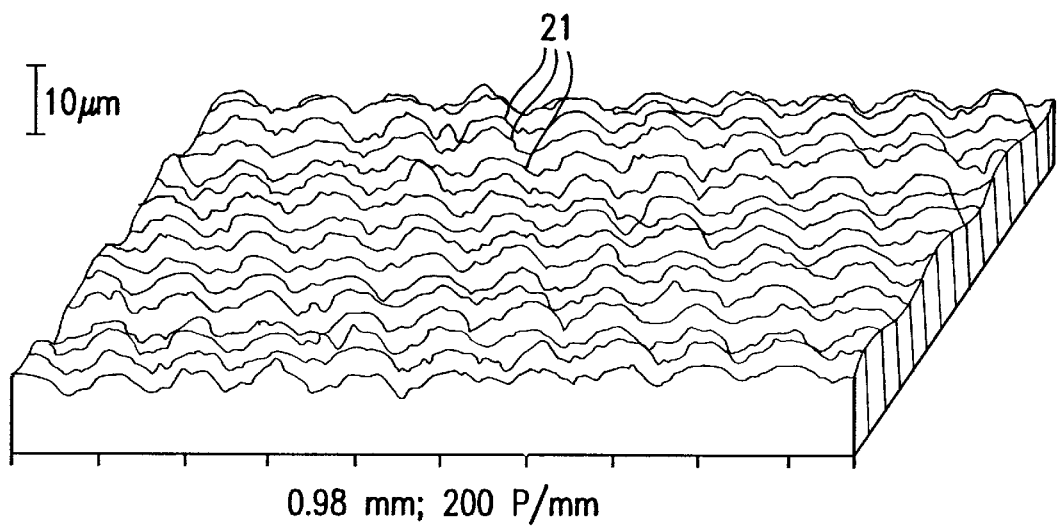
FIG. 6 shows a family of roughness profiles represented as being spaced further apart, in which both the individual profile lines, because of the greater distance, and a torsional structure can be seen.
Figure 7:
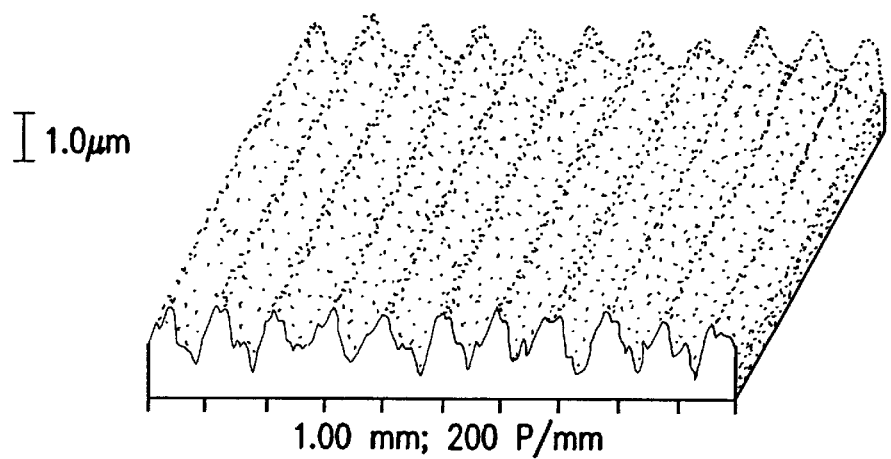
FIG. 7 is a representation according to the present invention of the roughness of a circumferential strip of a finished cylindrical surface with zero torsion, wherein the line structure is clearly visible despite the low roughness.
Figure 8:
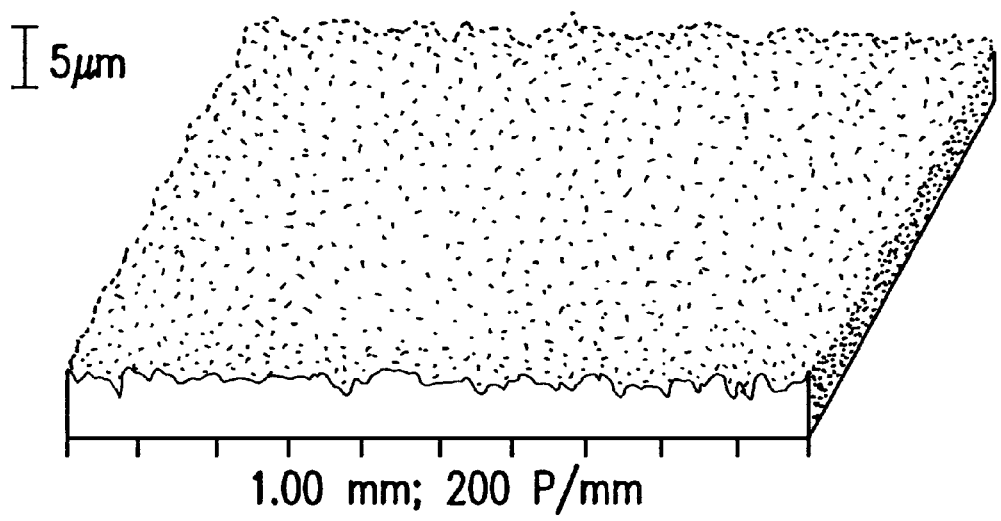
FIG. 8 is a view of the roughness similar to FIG. 7 of a surface subjected to torsion with greater roughness, in which a line structure and hence a torsion cannot be seen.

The individual local roughness profiles 21 of the various scanned sections 20 are printed out side by side in a close sequence corresponding to their positions, in accordance with their axial and circumferential relative positions on shaft spindle 13. The measurement charts 21 are then reproduced raised and/or elongated in the radial and axial directions and upset in the circumferential direction. The measurement charts are printed out in the radial direction (i.e. in the direction of surface roughness) raised by 400 to 2000 times and preferably by 500 to 1000 times. In FIGS. 6, 7, and 8, the scale selected in this regard is indicated by drawing a corresponding section and indicating the associated dimension. In axial direction 22 the measuring chart is printed out elongated by 50 to 200 times. In FIGS. 6, 7, and 8, the scale is indicated by scaling marks, each of which corresponds to $\frac{1}{10}$ of a millimeter. In circumferential direction 23, the measurement charts are printed out upset by a fifth to a half. FIGS. 6, 7, and 8, in the circumferential direction 23 directed backwards in terms of perspective, each show a full circumference of the workpiece.

By means of these various scales of reproduction for the individual dimensions, a topography is rendered visible that is distorted with different affinity with respect to the individual dimensions, but shows the microstructure of the surface of circumferential strip 19 in three dimensions in an indirect view. In the arrangement of the individual roughness profiles 21 that is shown deliberately elongated in the circumferential direction in FIG. 6, with respect to the normal representation (in FIGS. 7 or 8 for example), the individual measurement charts can be recognized as individual lines. Since the torsional structure in this example was relatively sharply pronounced, the torsional structure can be recognized even in this elongated method of representation. With a closer representation of the roughness profiles, for example according to FIG. 5, FIG. 7, or FIG. 9, a torsional structure becomes even clearer, especially when the roughness profiles are shown in color. As in geography when showing mountains, the profile lines can be given different colors for areas of different heights. Despite collisions between the individual adjacent lines when printed out, a three-dimensional image is produced that indicates the presence of a line structure of the topography.

Figure 9:
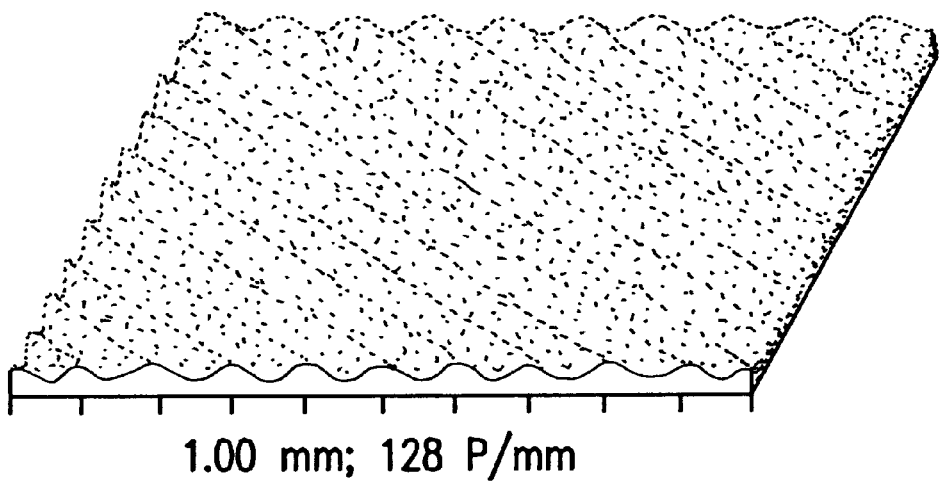
FIG. 9 shows a surface autocorrelation function for the view in FIG. 8, in which the stochastic roughness components are eliminated and thus the periodic line structure of the roughness as well as the torsional structure can be clearly seen.
Figure 10:
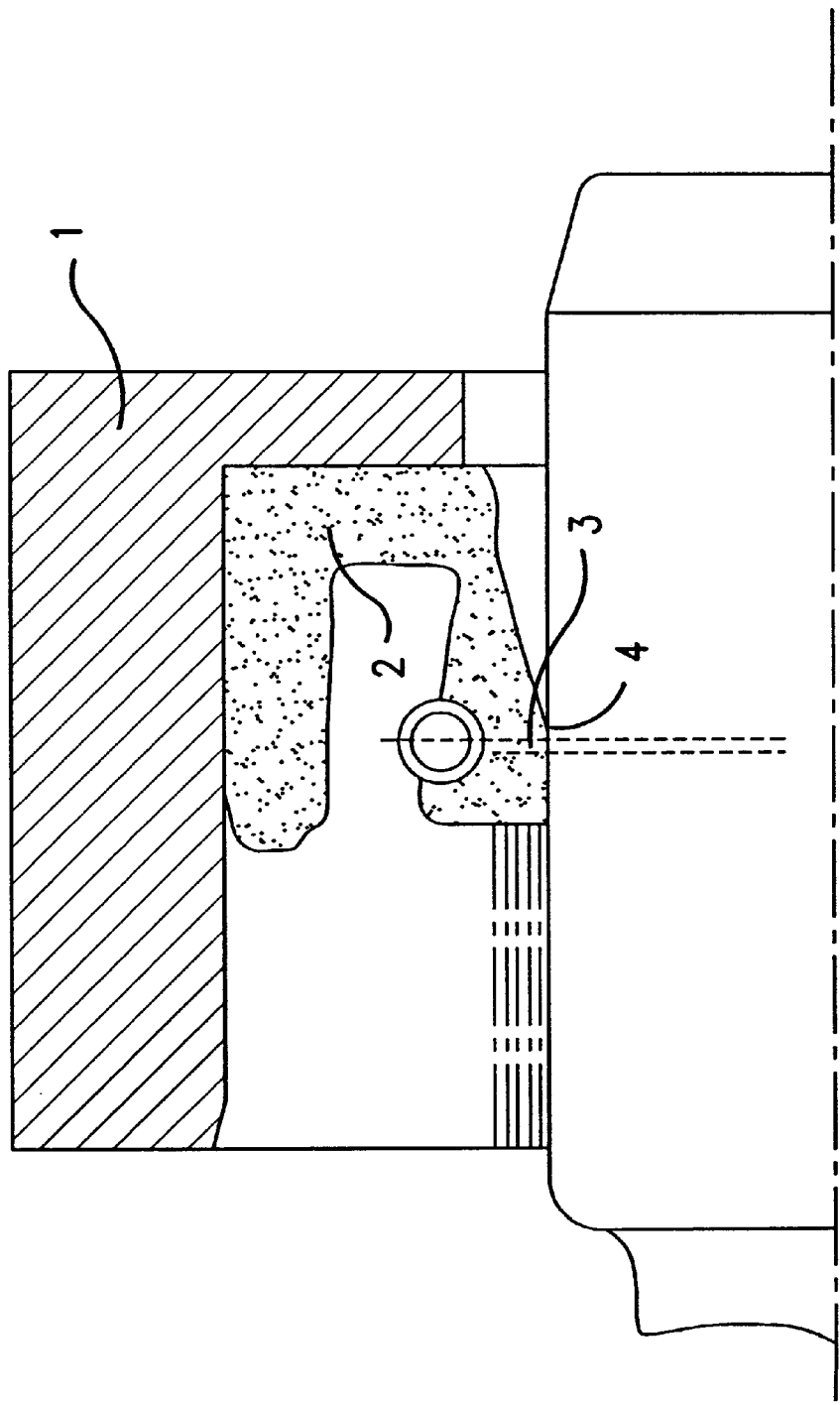
FIG. 10 shows a housing wall attached to a sealing ring with a sealing lip and the opposed running surface of a shaft journal side.

With a more pronounced manifestation of torsion, the most important parameters of the torsional structure can be seen already in the primary printout and/or in the primary topography which it renders visible. As a rule, however, a surface autocorrelation function is determined from the primary topography represented by the plurality of measurement points. In this way, randomly distributed portions are eliminated from the primary topography and a secondary topography of the surface is formed that contains essentially only periodic elements. The topography is then represented in a diagonal view in three dimensions. A comparison of FIGS. 8 and 9 shows the difference very clearly. While the primary topography of the roughness of a certain shaft journal according to FIG. 8 does not show a linear structure because of a high stochastic roughness component, this linear structure is quite clear in the autocorrelation function of the same workpiece shown in FIG. 9. Particularly with a very weak manifestation of a torsional structure and/or in one with a high stochastic roughness component, the torsional structure of the surface can only be recognized in an autocorrelation function of the primary topography.

Figure 5:
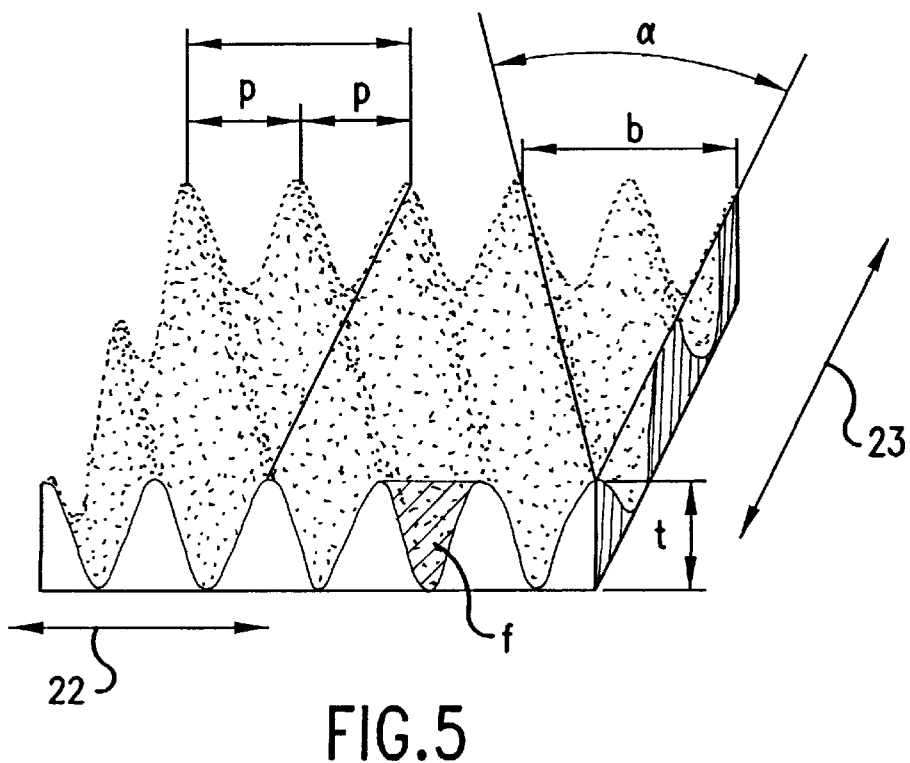
FIG. 5 is a partial view of an idealized torsion topography, with the various torsional parameters indicated.

The characteristics of the torsional structure can be determined from the primary or secondary topography as shown in FIG. 5. The evaluation is performed by measuring certain parameters from the scale representation, taking into account the respective scale of representation. With suitable evaluation software, these data, like the parameters mentioned below, can be calculated and output automatically. On the basis of the knowledge gained with the aid of the present invention, the following parameters of a torsional structure can be determined:

The period length p is the distance between adjacent wave peaks measured in the axial direction.

The number of lines is determined from the number of wave peaks in the circumferential direction over the complete circumference of the shaft by counting. In the case of an increased number of lines (in which case an increased recording density in the circumferential direction must be used) only one-tenth of a complete circumference, in other words only 36°, is evaluated, and the number of lines can easily be determined by multiplying the lines that can be counted by a factor of ten. Line numbers far greater than 100 have been observed on actual workpieces.

The torsional pitch h is equal to a multiple of the period length that corresponds to the number of lines. It can likewise be determined directly from the representation by measurement and calculation using the representation scale. Observations of a number of torsional structures and their evaluation show that at least in the autocorrelation function, the individual lines of the torsional structures have period lengths that are largely the same as one another and have approximately the same profile depth.

Torsional angle or angle of twist, α (as a rule, these are small angles far smaller than 5° and usually in the minute range), in radian measure, is obtained from the ratio between the circumferential length and the lead height h of the torsion. At least the angle of twist can be given, also in degrees of angle, from this ratio value through trigonometric conversion.

The profile or torsional depth t is between two adjacent shaft peaks.

The delivery cross section f as viewed in an axial section between two adjacent wave peaks is removed by planimetry or, assuming a sinusoidal shape of the wave peak flanks, determined by computation from the profile depth and the spacing of the wave peaks. Round shapes or pointed shapes of the wave peaks can also be taken into account by a correspondingly expanded evaluation software in area determination.

The foregoing disclosure has been set forth merely to illustrate the present invention and is not intended to be limiting. Since modifications of the disclosed embodiments incorporating the spirit and substance of the present invention may occur to persons skilled in the art, the present invention should be construed to include everything within the scope of the appended claims and equivalents thereof.

What is claimed is:

1. A method for determining a torsional structure in the surface roughness of a finished solid or hollow cylindrical part, comprising:

making a plurality of axially aligned test scores on a circumferential strip of a shaft journal, with a high axial measurement point density at different but exactly known circumferential and axial positions;

printing individual local roughness profiles of the scores according to their axial and circumferential positions on the shaft journal corresponding to their locations in a close sequence next to one another, wherein a measuring chart is raised or elongated in the radial and axial directions and is shown upset in the circumferential direction; and showing a primary topography that is distorted with different affinities relative to the individual roughness profiles but showing the microstructure of the surface of circumferential strip in three dimensions as viewed at an unwound angle.

2. The method according to claim 1, further comprising using the primary topography to determine a surface autocorrelation function so that stochastic elements are eliminated; thereby obtaining a secondary surface topography that essentially contains only periodic elements, wherein said secondary surface is unwound in a diagonal view in three dimensions.

3. The method according to claim 2, wherein at least one of the following parameters of a torsional structure is determined from the primary or the secondary topography: angle of twist (α), torsional pitch (h), period length (p), number of lines, profile or torsional depth (t), and an open delivery cross section (f), as viewed in an axial section, of the periodic elements between two adjacent wave peaks.

4. The method according to claim 1, wherein the torsional structure is determined in an area of the circumferential strip at which a closed sealing lip of an annular seal abuts the shaft journal.

5. The method according to claim 4, wherein the area is at least four times as wide as an application width of the sealing lip to the shaft journal.

6. The method according to claim 4, wherein the area is approximately ten times as wide, than corresponds to the application width of the sealing lip to the shaft journal.

7. The method according to claim 1, wherein the point density is 100 to 1000 measurement points per millimeter.

8. The method according to claim 1, wherein the point density is 200 to 400 measurement points per millimeter.

9. The method according to claim 1, wherein the scores are made in the circumferential direction at a distance from one another that corresponds to 0.5 to 2 times the period length of the periodic elements of the torsional structure.

10. The method according to claim 1, wherein 60 to 75 scores are made uniformly distributed over the entire circumference.

11. The method according to claim 1, wherein 30–120 test scores are uniformly distributed over a fraction of the entire circumference.

12. The method according to claim 11, wherein 60–75 test scores are made.

13. The method according to claim 11, wherein said fraction is a decimal fraction.

14. The method according to claim 1, wherein a measuring chart is printed out in the radial direction and is increased by 400–2000 times.

15. The method according to claim 14, wherein said radial direction is in the direction of surface roughness.

16. The method according to claim 14, wherein said measuring chart is increased 500–1000 times.

17. The method according to claim 1, wherein a measuring chart is printed out in the axial direction and elongated 50 to 200 times.

18. The method according to claim 1, wherein a measuring chart is printed out in the circumferential direction and upset by a fifth to a half.

* * * * *